Patented Dec. 6, 1938

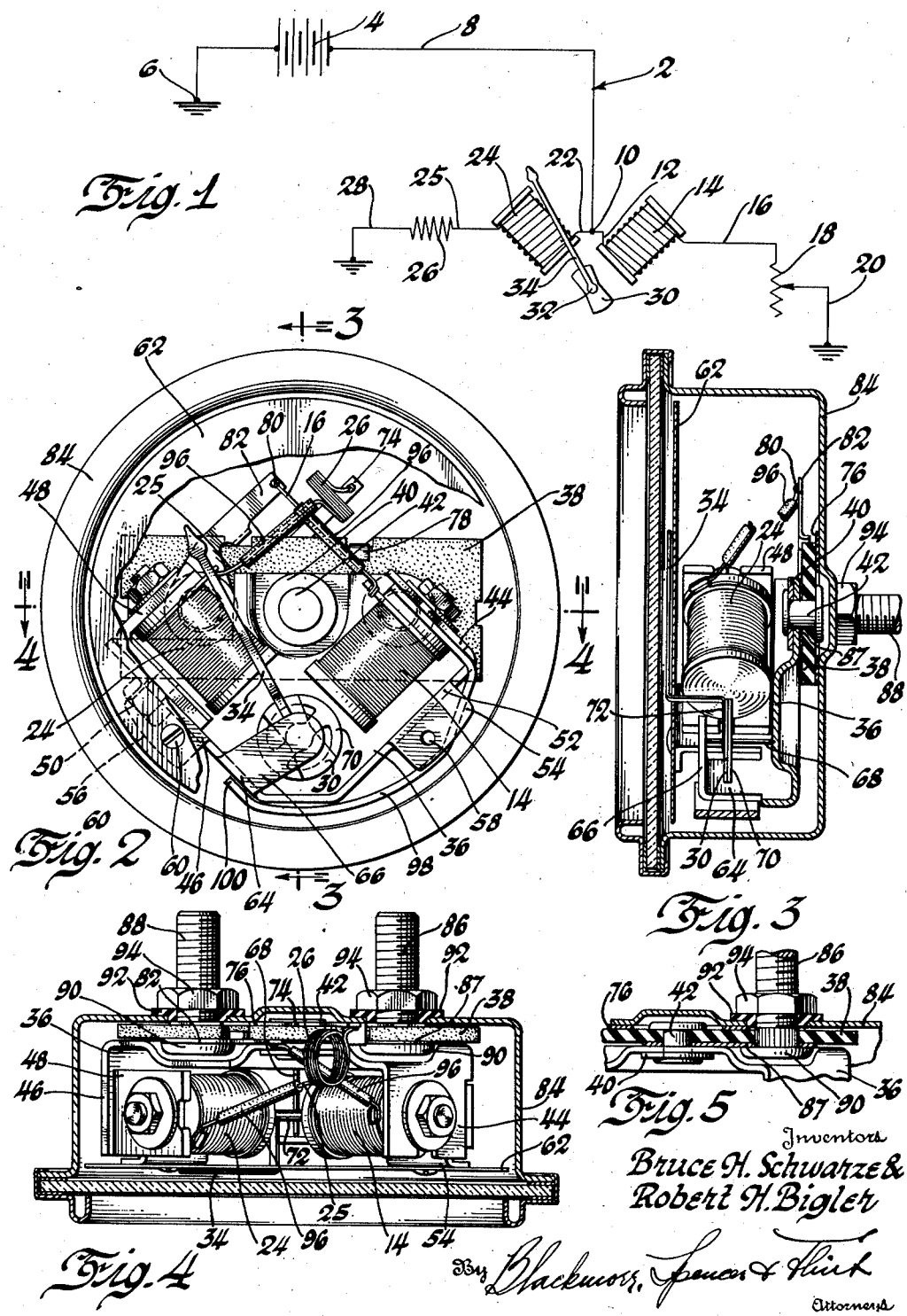

2,139,385

UNITED STATES PATENT OFFICE

2,139,385

ELECTRIC THERMOGAUGE-DASH UNIT

Bruce H. Schwarze and Robert H. Bigler, Flint, Mich., assignors to General Motors Corporation, Detroit, Mich., a corporation of Delaware Application January 25, 1937, Serial No. 122,190

7 Claims. (Cl. 171—95)

This invention relates to an electrical indicating instrument of the differential galvanometer type for use in indicating changes in electric current of a heat responsive unit located at a distance from the differential galvanometer.

The instrument of the invention is intended for use in connection with the thermostatic element described and claimed in the copending application of Donald W. Randolph and Robert H. Bigler Serial No. 122,657, filed January 27, 1937.

In conducting the experiments made in obtaining a satisfactory heat responsive unit of the type described in the copending application, an effort was made to use the differential galvanometer of the Bacon Patent 1,791,786 but it was found that the type of scale reading desired could not be obtained. It was also found that the desired length of swing of the pointer or arc of movement could not be obtained with the instrument of the Bacon patent. Inasmuch as it was desirable to have a similar type of instrument it was necessary to conduct considerable experimentation to obtain coils which would give the proper pointer swing and the desired type of scale reading. As a result of the experiments it was found that if the right hand coil as shown on the drawing was given a resistance of 8 ohms and composed of a definite number of turns of a definite wire, and the left hand coil was given a resistance of 18 ohms and composed of a definite number of turns of a definite wire, that with the coils so arranged and with an additional 20 ohm resistance of a wire placed in the left hand coil circuit the proper scale reading and the proper movement of the pointer was obtained. This 20 ohm resistance wire may be any wire of negligible temperature coefficient of resistance, such as a composition of nickel 45% and copper 55%. It was found that the differential galvanometer with the coils and resistances as indicated would give proper response in connection with an electrically responsive heat unit positioned at a distance from the indicating instrument.

On the drawing

Figure 1 is a diagrammatic view of an electric circuit used in connection with the invention.

Figure 2 is a view looking into the front of the instrument with the dial broken away and the bezel and glass removed better to illustrate the construction.

Figures 3 and 4 are sections on the lines 3—3 and 4—4 of Figure 2.

Figure 5 is a sectional detailed view of the electrical connections at one of the terminal bolts.

Referring to the drawing, the circuit as a whole is indicated at 2. The battery is indicated at 4 having one side grounded as at 6 and the other side having the lead 8 which leads to a contact 10. From the contact 10 a part of the current passes to the wire 12 through the right hand coil 14 through the second wire 16 to the variable resistance 18 and from the resistance through the wire 20 to ground. From the contact 10 a second lead or wire 22 conducts the current to the left hand coil 24 and from the coil the current passes through the wire 25 to the resistance 26. From the resistance 26 the current passes through the wire 28 to the ground and back to the battery. The magnetic field created by the coils 14 and 24 acts on the armature 30 which is secured to the axis 32 of a swingable pointer 34. The influence of the magnetic field of the coils on the armature 30 causes a movement of the pointer 34 in accordance with the strengths of the fields of the individual coils 14 and 24.

Referring to Figures 2, 3, and 4, the coils 14 and 24 are mounted on a base plate 36 and are arranged in fan shape or at an angle to each other as shown. The base plate is secured to the insulating strip 38 by means of the washer 40 which has the end of the rivet 42 turned thereover. The base plate 36 has the upturned fingers 44 and 46 on which the coils 14 and 24 respectively are mounted. The finger 46 has the angle piece 48 adjustably secured thereon by means of the bolt and nut 50 for the purpose of adjusting the coil 24 relative to the coil 14. The base plate or frame has a third upturned finger 52 having an ear 54, while the finger 46 has an ear 56. The ears 54 and 56 are provided with suitable openings 58 to receive screws 60 which fasten the dial 62 in place.

The base plate or frame has a fourth finger 64 the end of which forms an inwardly bent arm 66 and between the arm 66 and the base of the frame the shaft 68 of the pointer is pivotally mounted. The armature 30 is secured to the shaft 68 by means of the ring 70 on one side and the bent end 72 of the pointer on the other side, the parts 30, 70 and 72 being secured together in any suitable way and rigidly mounted on pointer 34.

In Figures 2 and 4 the wire resistance 26 is shown as being in the form of a coil and being connected at 74 to a finger projecting from the plate 76. The wire 25 connects the coil 24 to the coil 26.

The insulating piece 38 has secured on the underside thereof the metal plate 76, the plate 76 being secured in place by the turned over fingers 78. The wire 16 from the coil 14 is connected at 80 to a finger 82 secured to the terminal 88. The insulation 38 insulates the plate 76 from the base 36 of the frame so that there is no electrical connection between the base 36 and the plate 76.

In order to secure sufficient movement of the pointer and to obtain the desired type of scale reading where the differential galvanometer is to be used in connection with a heat responsive unit which is installed at the internal combustion engine of an automotive vehicle, we found that the desired amount of pointer movement and scale reading was obtained if the right hand coil 14 were given a resistance of 8 ohms, that is, composed of 650 turns of No. 32 enameled copper wire and right hand wound, and at the same time forming the coil 24 of 800 turns of No. 33 Driver Harris alloy No. 11 enameled copper wire or No. 34 enameled copper wire right hand wound having a resistance of 18 ohms and a composition of substantially Cu 70%, Mn 23%, Fe 7%, and including in series with the coil 24 an additional 20 ohm resistance such as indicated at 26. This 20 ohm series resistance 26 is formed of wire having a composition Ni 45%, Cu 55%, and is used to minimize the error due to internal heating. With this winding and composition of the coils it was found that the instrument could be calibrated to read directly in temperatures by determining the amount of current passed by the heat sensitive unit for a given temperature.

The instrument is mounted in the casing 84 having openings in the bottom through which there project the terminals 86 and 88. The heads 90 are inside the casing and out of direct electrical contact with the frame 36. The head 90 of terminal 86 is connected to the frame 36 by means of the plate 87. Suitable insulating washers 92 having nuts 94 hold the frame 36 and insulating strip 38 to the casing 84.

The leads or wires 16 and 25 are preferably surrounded by insulators 96, and an iron strip 98 is secured to the finger 44 at the end of the coil 14. The iron strip 98 concentrates the lines of force of the electrical field. The strip 98 extends adjacent the armature 30 and ends at 100.

The gauge of the invention is adaptable for use in many relations. For instance, the resistance 18 may be placed in the water cooling system of the internal combustion engine of an automotive vehicle, on the wing of an airplane, an oven, etc.

The operation of the gauge is as follows: the current enters the terminal 86 and passes through the jumper strip or plate 87 to the central rivet 42 and the frame 36. From the frame 36 the current divides between the coils 14 and 24. The current from the coil 14 passes through the wire 16 to the finger 82, through the contact 80, and to the resistance 18 and then to ground through the wire 20 and back to the battery 4. The current passing through the coil 24 passes through the wire 25, the coil 26, the finger 74, plate 76, and frame 84 to ground and back to the battery. The amount of resistance 18 in series with the coil 14 will determine the amount of current passing through the coils 14 and 24 and will determine the strength of the field produced by the two coils. The strength of this field will influence the iron vane armature 30 and determine the position of the pointer 34.

We claim:

1. In an electrical measuring instrument, a frame, a coil mounted on the frame and having substantially 650 turns of No. 32 enameled copper wire, a second coil mounted on the frame and comprising substantially 800 turns of enameled copper wire, said coils being electrically connected and capable of being differentially energized, a resistance in series with said second coil said resistance comprising a wire having a negligible temperature coefficient of resistance, said coils being positioned in fan shape, and a pointer pivotally mounted substantially at the point of divergence of the fan and adapted to move across a dial, said pointer having an armature rigidly connected therewith, said pointer and armature capable of being moved by the differential electrical field created by the coils.

2. In an electrical measuring instrument, a frame, a coil mounted on the frame and having a resistance of substantially 8 ohms, a second coil mounted on the frame and having a resistance of substantially 18 ohms, said coils being arranged in fan shape and capable of being differentially energized, a 20 ohm resistance in series with the second coil, and a pointer pivoted to the frame and mounted substantially at the point of divergence of the fan and adapted to move across a dial, said pointer having an armature rigidly connected therewith, said pointer and armature capable of being moved by the differential electrical field created by the coils.

3. In an electrical measuring instrument, a frame, a coil mounted on the frame and having substantially 650 turns of No. 32 enameled copper wire, a second coil mounted on the frame and comprising substantially 800 turns of enameled copper wire, said coils being electrically connected and capable of differential energization, a 20 ohm wire resistance in series with said second coil, said resistance having a negligible temperature coefficient of resistance, and a pointer pivoted to the frame and mounted within the field of the coils and adapted to move across a dial, said pointer having an armature rigidly connected therewith, said pointer and armature capable of being moved by the differential electrical field created by the coils.

4. In an electrical measuring instrument, a frame, a piece of insulating material to which the frame is secured, a coil mounted on the frame, a resistance in series with the coil, a plate connected to the insulating material and insulated from the frame thereby, said resistance connected to said plate, a second coil mounted on the frame and electrically connected to first named coil, said coils capable of differential energization to create a varying field thereabout, means electrically to connect said second coil to the plate, and a pointer pivotally mounted within the field of both coils and adapted to move across a dial, said pointer having an armature rigidly connected therewith, said pointer and armature capable of being moved in accordance with the strengths of the fields of the coils.

5. In an electrical measuring instrument, an insulating member, a metal frame secured to one side of the insulating member, a metal conducting plate secured to the other side of the insulating member, said frame and plate being insulated from each other, a contact secured to the insulating member, a metal strip electrically connecting the contact to the frame, two coils mounted on the frame and electrically connected thereto, said coils capable of being differentially energized to create a varying field thereabout, a second contact mounted in the insulating member and being out of electrical contact with the frame, a finger connected to the contact, one of said coils being connected to said finger, a resistance in series with the other coil, a finger projecting from the contacting plate, said resistance connected to said second finger, and a swingable pointer having an armature movable in response to variations in the fields of the coils to cause the pointer to swing across a dial.

6. In an electrical measuring instrument, an insulating member, a metal frame secured to one side of the insulating member, a metal conducting plate secured to the other side of the insulating member, said frame and plate being insulated from each other, a contact secured to the insulating member, a metal strip electrically connecting the contact to the frame, two coils mounted on the frame and electrically connected thereto, one of said coils being adjustable to vary the position of its field, said coils capable of being differentially energized to create a varying field thereabout, a second contact mounted in the insulating member and being out of electrical contact with the frame, a finger connected to the contact, one of said coils being connected to said finger, a resistance in series with the other coil, a finger projecting from the contacting plate, said resistance connected to said second finger, and a swingable pointer having an armature movable in response to variations in the fields of the coils to cause the pointer to swing across a dial.

7. In an electrical measuring instrument, an insulating member, a metal frame secured to one side of the insulating member, a metal conducting plate secured to the other side of the insulating member, said frame and plate being insulated from each other, a contact secured to the insulating member, a metal strip electrically connecting the contact to the frame, two coils mounted on the frame and electrically connected thereto, said coils capable of being differentially energized to create a varying field thereabout, a second contact mounted in the insulating member and being out of electrical contact with the frame, one of said coils being connected to said second contact, a resistance in series with the other coil, said resistance connected to said conducting plate, and a swingable pointer having an armature movable in response to variations in the fields of the coils to cause the pointer to swing across a dial.

BRUCE H. SCHWARZE.
ROBERT H. BIGLER.